(12) United States Patent
Wu (10) Patent No.: US 11,448,804 B2
(45) Date of Patent: Sep. 20, 2022

(54) PRISM ELEMENT AND PROJECTION APPARATUS

(71) Applicant: Coretronic Corporation, Hsin-Chu (TW)

(72) Inventor: Hsuan-I Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/117,137

(22) Filed: Dec. 10, 2020

(65) Prior Publication Data

US 2021/0181388 A1 Jun. 17, 2021

(30) Foreign Application Priority Data

Dec. 13, 2019 (CN) .......................... 201922230044.4

(51) Int. Cl.
*G02B 5/04* (2006.01)
*G03B 21/28* (2006.01)
*G03B 21/20* (2006.01)

(52) U.S. Cl.
CPC ............. *G02B 5/04* (2013.01); *G03B 21/204* (2013.01); *G03B 21/28* (2013.01)

(58) Field of Classification Search
CPC ...... G02B 5/04; G02B 27/14; G03B 21/2066; G03B 21/204; G03B 21/28; G03B 21/008
See application file for complete search history.

(56) References Cited

U.S. PATENT DOCUMENTS

| | | | | |
|---|---|---|---|---|
| 3,871,750 A | * | 3/1975 | Mecklenborg | G02B 17/023 359/834 |
| 6,349,006 B1 | * | 2/2002 | Okamori | G02B 5/04 348/E5.142 |
| 6,454,417 B1 | * | 9/2002 | Takamoto | G02B 26/0833 348/771 |
| 6,560,048 B1 | | 5/2003 | Okamori et al. | |
| 8,052,284 B2 | * | 11/2011 | Lin | G03B 21/008 353/81 |
| 2002/0015136 A1 | * | 2/2002 | Sawamura | G03B 21/005 353/33 |

(Continued)

FOREIGN PATENT DOCUMENTS

| | | |
|---|---|---|
| CN | 205374858 U | 7/2016 |
| JP | 2004191878 A * | 7/2004 ............. G02B 27/18 |

*Primary Examiner* — Magda Cruz (57) ABSTRACT

A prism element configured to be disposed between an illumination system and a light valve includes a first prism and a second prism. The first side face, the second side face, and the third side face of the first prism are connected in sequence. The incident surface, the emitting surface, and the transmission surface of the second prism are connected in sequence. The incident surface and the third side face are disposed face to face. The angle between the transmission surface and a normal line of the emitting surface is ±20°. After an illumination light provided by the illumination system transmits through the first side face and enters the first prism, the illumination light transmitting through the third side face forms a transmission light. The transmission light enters the second prism from the incident surface and leaves the second prism from the transmission surface. A projection apparatus is also provided.

10 Claims, 6 Drawing Sheets

(56) References Cited

U.S. PATENT DOCUMENTS

| | | | |
|---|---|---|---|
| 2005/0018146 A1* | 1/2005 | Chang | G03B 21/28 |
| | | | 353/98 |
| 2005/0030481 A1* | 2/2005 | Chang | G03B 21/008 |
| | | | 353/31 |
| 2006/0061892 A1* | 3/2006 | Penn | G02B 5/04 |
| | | | 359/833 |
| 2007/0086094 A1* | 4/2007 | Tang | H04N 9/3152 |
| | | | 359/831 |

* cited by examiner

PRISM ELEMENT AND PROJECTION APPARATUS

CROSS-REFERENCE TO RELATED APPLICATION

This application claims the priority benefit of CN201922230044.4, filed on 2019 Dec. 13. The entirety of the above-mentioned patent application is hereby incorporated by reference herein and made a part of this specification.

FIELD OF THE INVENTION

The invention relates to a prism element and a projection apparatus applying the prism element, and more particularly to a prism element and a projection apparatus facilitating improving light leakage and increasing the contrast of projection image.

BACKGROUND OF THE INVENTION

A projection apparatus is usually equipped with a prism element to guide an illumination light generated by a light source device to a light valve. The prism element is mainly made by bonding two triangular prisms (first prism and second prism). In addition, a gap of 5 micrometers to 10 micrometers is maintained between the two triangular prisms, so that the illumination light is allowed to be totally reflected at the interface of the two triangular prisms and transmits toward the light valve to form an image light, and eventually forms a projection image on a screen via a projection lens. An opaque surface of the prism element is generally blackened (e.g. coated with black paint) to absorb stray light to increase the contrast of the projection image. However, when the gap between the two triangular prisms is too small or the incident angle of the illumination light is less than the total reflection angle of the prism, the illumination light may transmit through the first prism and the gap directly and arrive at the second prism. At this time, if the intensity of the illumination light is too high, it is easy to burn the opaque surface of the second prism (coated with black paint); as a result, the light is not absorbed by the black paint, or even enters the projection lens by reflection and scattering, causing light leakage.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a prism element and a projection apparatus, which can improve the problem of light leakage and increase the contrast of projection image.

Other advantages and objects of the invention may be further illustrated by the technical features broadly embodied and described as follows.

In order to achieve one or a portion of or all of the objects or other objects, an embodiment of the invention provides a prism element configured to be disposed between an illumination system and a light valve, and the prism element includes a first prism and a second prism. The first prism includes a first side face, a second side face, and a third side face. The first side face, the second side face, and the third side face are connected in sequence. The second prism is disposed at the third side face, and includes an incident surface, an emitting surface, and a transmission surface. The incident surface, the emitting surface, and the transmission surface are connected in sequence, and the incident surface and the third side face are disposed face to face. An angle between the transmission surface and a normal line of the emitting surface is ±20°. After an illumination light provided by the illumination system transmits through the first side face and enters the first prism, the illumination light transmitting through the third side face forms a transmission light, the transmission light enters the second prism from the incident surface, and the transmission light leaves the second prism from the transmission surface.

In order to achieve one or a portion of or all of the objects or other objects, an embodiment of the invention provides a projection apparatus including an illumination system, a light valve, a projection lens, and the prism element mentioned above. The illumination system provides an illumination light. The light valve is disposed on a transmission path of the illumination light to convert the illumination light into an image light. The projection lens is disposed on a transmission path of the image light. The prism element is disposed among the illumination system, the light valve and the illumination system to guide the illumination light toward an active surface of the light valve and guide the image light toward the projection lens.

In the prism element and the projection apparatus of the invention, since the angles formed between the transmission surfaces and the normal lines of the emitting surfaces of the second prisms are ±20°, the transmission lights can transmit through the transmission surfaces of the second prisms directly, so that the most of the transmission lights will not be reflected back into the second prisms and not transmit to the projection lenses and the light valves of the projection apparatuses, and therefore, the advantages of avoiding the light leakage and increasing the contrast of the image are achieved. In addition, since the transmission lights can transmit through the transmission surfaces of the second prisms directly, the accumulation of heat at the lens component can be reduced, so as to reduce the impact of heat on the quality of the projection image. Further, the step of applying black paint on the second prisms can be omitted in the fabrication process of the lens component, so that the fabrication time can be reduced. Therefore, the prism element and the projection apparatus of the invention have the advantages of avoiding the light leakage, increasing the contrast of the projection image, lowering the impact of heat on the quality of the projection image, and reducing the fabrication time.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
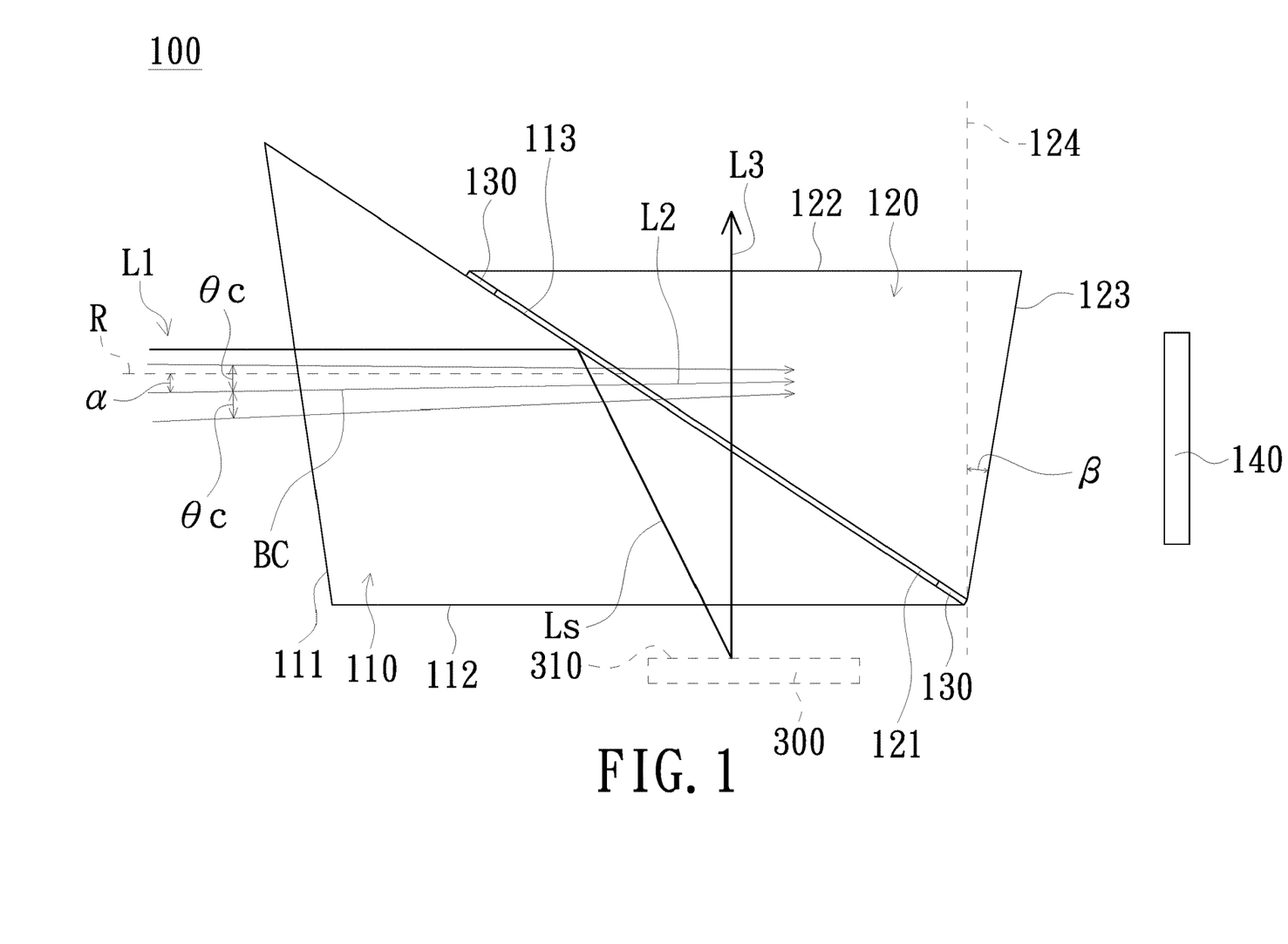
FIG. 1 is a schematic side view of a prism element in accordance with one embodiment of the invention.

FIG. 1 is a schematic side view of a prism element in accordance with one embodiment of the invention. Referring to FIG. 1, the prism element of the embodiment is adopted to be disposed between an illumination system (not shown) and a light valve 300. The prism element 100 includes a first prism 110 and a second prism 120. The first prism 110 includes a first side face 111, a second side face 112, and a third side face 113, and the first side face 111, the second side face 112, and the third side face are connected in sequence. The second prism 120 is disposed at the third side face 113 of the first prism 110. The second prism 120 includes an incident surface 121, an emitting surface 122, and a transmission surface 123, and the incident surface 121, the emitting surface 122, and the transmission surface 123 are connected in sequence. The incident surface 121 of the second prism 120 and the third side face 113 of the first prism 110 are arranged face to face. An angle β is formed between the transmission surface 123 and a normal line 124 of the emitting surface 122. After an illumination light L1 provided by the illumination system transmits through the first side face 111 and enters the first prism 110, the illumination light L1 transmitting through the third side face 113 forms a transmission light L2. The transmission light L2 enters the second prism 120 from the incident surface 121 and leaves the second prism 120 from the transmission surface 123. In addition, in the embodiment, a gap is formed between the incident surface 121 of the second prism 120 and the third side face 113 of the first prism 110. Air is in the gap. An adhesive layer 130 is disposed around the gap to fix the first prism 110 and the second prism 120. Further, in the embodiment, the first prism 110 and the second prism 120 are triangular prisms, but the invention is not limited thereto. In other embodiment, the first prism and the second prism can be quadrangular prisms.

In the embodiment, the second side face 112 mentioned above faces toward an active surface 310 of the light valve 300. After the illumination light L1 transmits through the first side face 111 and enters the first prism 110, when an incident angle of the illumination light L1 at the third side face 113 is larger than a critical angle of total reflection, the third side face 113 forms a total refection interface. The illumination light L1 reflected by the total reflection interface forms a sub-illumination light Ls. The sub-illumination light Ls transmits through the second side face 112 and toward the light valve 300. The light valve 300 converts the sub-illumination light Ls into an image light L3. Further, the illumination light L1 is a light having cone angle distribution. When the incident angle of the illumination light L1 at the third side face 113 is smaller than the critical angle of total reflection, the illumination light L1 transmitting through the third side face 113 forms the transmission light L2. Further, when the sub-transmission light Ls transmits toward the light valve 300, the sub-illumination light Ls leaves the first prism 110 from the second side face 112, and then arrives at the active surface 310 of the light valve. After the illumination light L1 is incident on the third side face 113 of the first prism 110, a part of the illumination light L1 passes through the third side face 113 and generates the transmission light L2, and another part of the illumination light L1 is reflected by the third side face 113 and generates the sub-illumination light Ls. In addition, in the embodiment, the second side face 112 of the first prism 110 and the active surface 310 of the light valve 300 are parallel with each other, the emitting surface 122 of the second prism 120 and the second side face 112 of the first prism 110 are parallel with each other, but the invention is not limited thereto.

In the embodiment, the angle β between the transmission surface 123 and the normal line 124 of the emitting surface 122 have to be between $(\alpha+\theta_C-\theta_{TIR})$ and $(\theta_{TIR}-\alpha-\theta_C)$, so that the transmission light L2 can pass through the transmission surface 123 and the percentage of total reflection of the transmission light L2 at the transmission surface 123 is lowered, avoiding part of the transmission light L2 from being totally-reflected into a projection lens or the light valve 300, and thereby affecting the quality of the image formed by the image light L3, wherein $\theta_{TIR}$ is the critical reflection angle of the first prism 110. According to Snell's law, $\theta_{TIR}$ is related to the material (reflectivity) of the first prism 130. In the embodiment, the first prism 110 and the second prism 120 are glass, so $\theta_{TIR}$ is approximately equal to 42°. An angle between the main light BC of the illumination light L1 and the emitting surface 122 is α. The reference line R shown in FIG. 1 is parallel to the emitting surface 122 of the second prism 120. The angle α is marked at the included angle between the main light BC and the reference line R. $\theta_C$ is the cone angle of the illumination light L1. In the embodiment, the angle α is approximately equal to 10°, the cone angle $\theta_C$ is approximately equal to 12°. Accordingly, in the embodiment, the angle β may be, for example, ±20°; for instance, as shown in FIG. 1, the angle β is 20°, but the invention is not limited thereto.

The light transmittance of the transmission surface 123 mentioned above may be, for example, more than 90% to increase the transmission effect of the transmission light L2. In the embodiment, the light transmittance of the transmission surface 123 may be increased by polishing or coating an anti-reflection layer thereon, but the invention is not limited thereto.

The prism element 100 mentioned above further includes a light absorption component 140. The light absorption component 140 is disposed at a side of the transmission surface 123 distal away from the incident surface 121. An interval is formed between the light absorption component 140 and the transmission surface 123 of the second prism 120, so as not to contact directly. The light absorption component 140 is adopted to absorb the transmission light L2 leaving the second prism 120 from the transmission surface 123. In the embodiment, the light absorption component 140 may be, for example, a black ink layer or other light absorption material layer. The black ink layer (the light absorption component) may be coated on, for example, an inner surface of a casing of a projection apparatus adjacent to the prism element 100, but the invention is not limited thereto. In other embodiment, the light absorption component 140 can be disposed in the casing instead of on the inner surface of the casing. The projection apparatus is, for example, a projector.

Figure 2:
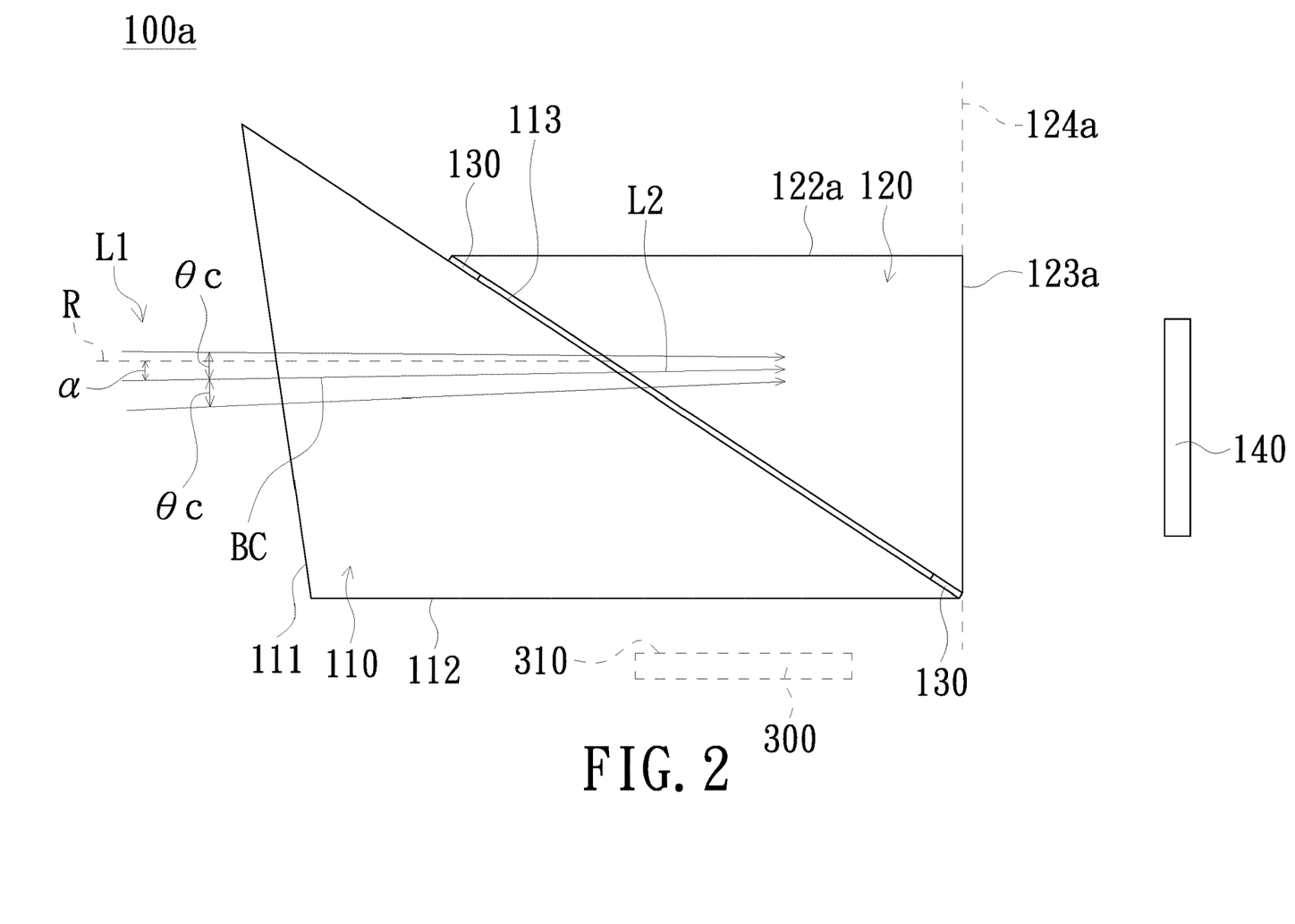
FIG. 2 is a schematic side view of a prism element in accordance with another embodiment of the invention.

FIG. 2 is a schematic side view of a prism element in accordance with another embodiment of the invention. The difference between the prism element 100a in FIG. 2 and the prism element 100 in FIG. 1 is that the angle between the transmission surface 123a and the normal line 124a of the emitting surface 122a is 0°. The transmission surface 123a is parallel to the normal line 124a of the emitting surface 122a.

Figure 3:
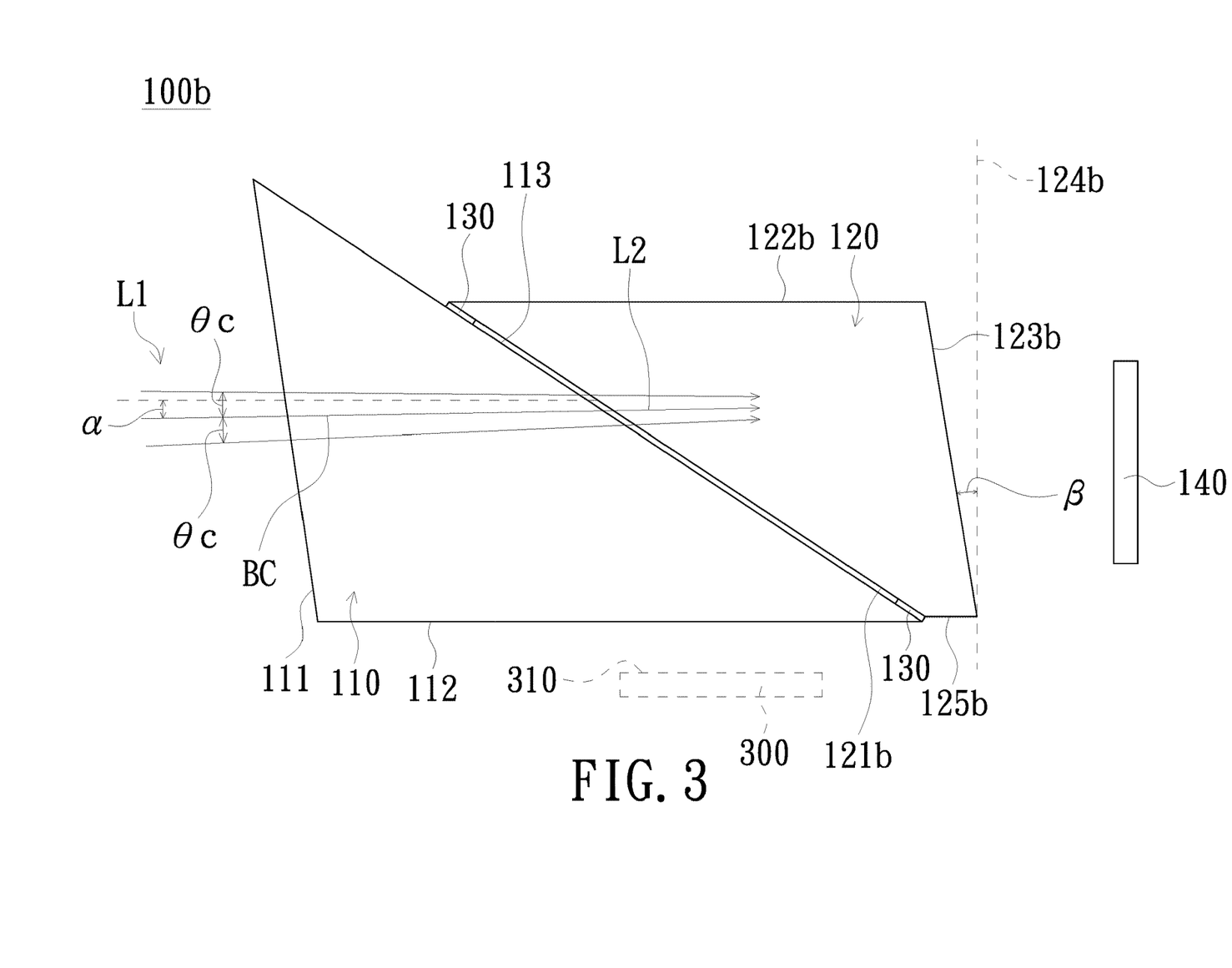
FIG. 3 is a schematic side view of a prism element in accordance with still another embodiment of the invention.

FIG. 3 is a schematic side view of a prism element in accordance with still another embodiment of the invention. The difference between the prism element 100b in FIG. 3 and the prism element 100 in FIG. 1 is that the angle β between the transmission surface 123b and the normal line 124b of the emitting surface 122b is −20°, and the second prism 120 of the prism element 100b further includes a bottom surface 125b. Furthermore, the bottom surface 125b is connected between the incident surface 121b and the transmission surface 123b. By the bottom surface 125b, the bottom of the whole prism element 100b is increased, so that the positioning of the whole prism element 100b is easy, and thereby increasing the stability of the whole prism element 100b. Meanwhile, the surface area of the second prism 120b is increased, so that the heat dissipating performance of the second prism 120 is enhanced. The prism element 100b is used in a high-power projection apparatus.

Figure 4:
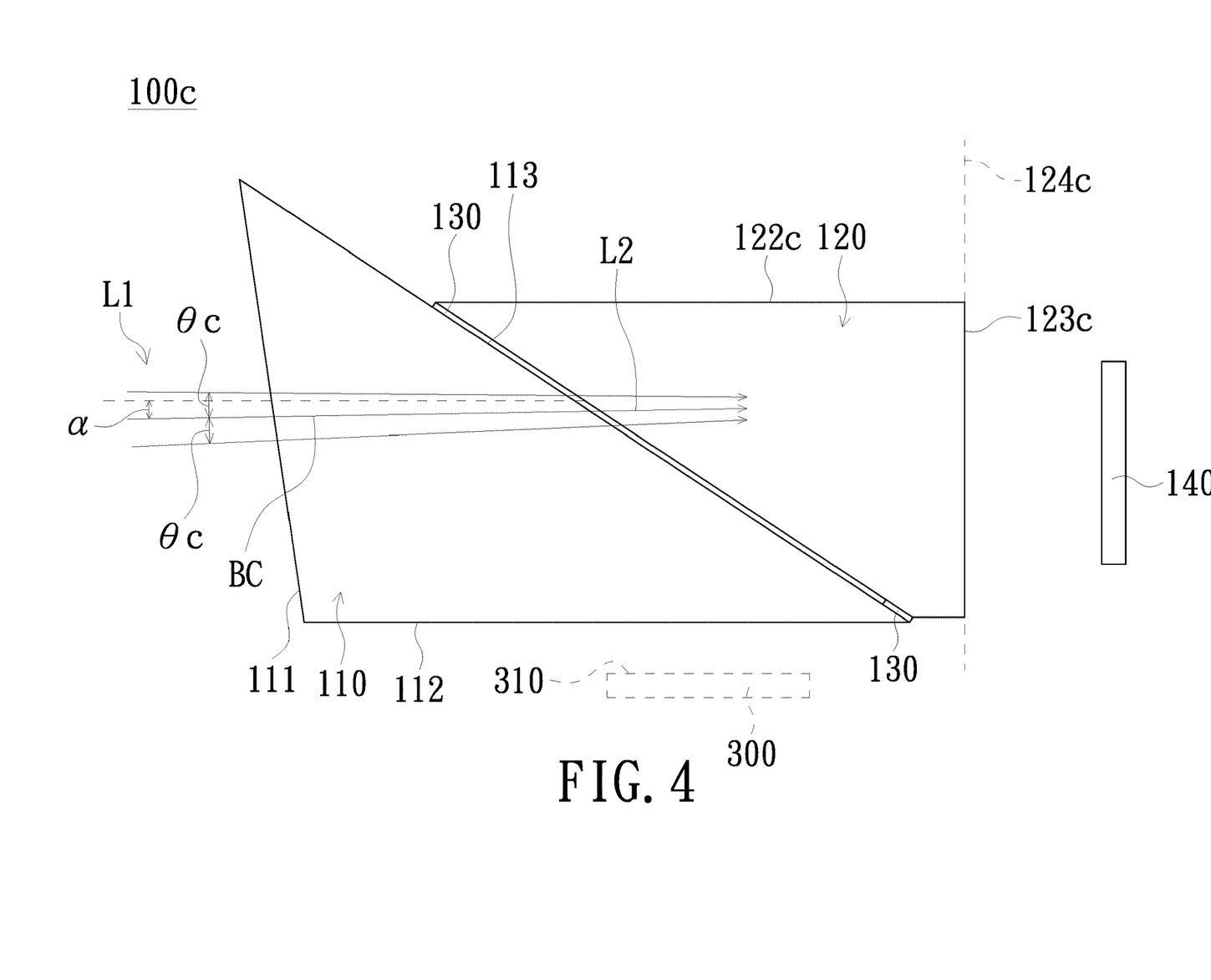
FIG. 4 is a schematic side view of a prism element in accordance with the other embodiment of the invention.

FIG. 4 is a schematic side view of a prism element in accordance with the other embodiment of the invention. Referring to FIGS. 3 and 4, the differences between the prism element 100c of the embodiment and the prism element 100b shown in FIG. 3 lie in: in the prism element 100c of FIG. 4, the angle between the transmission surface 123c and the normal line 124c of the emitting surface 122c is 0°. The transmission surface 123b is parallel to the normal line 124a of the emitting surface 122b.

In the prism elements 100, 100a, 100b, 100c of the embodiments of the invention, since the angles β formed between the transmission surfaces 123, 123b, and the normal lines 124, 124b, of the emitting surfaces 122, 122b, are ±20° and the angles formed between the transmission surfaces 123a, 123c, and the normal lines 124a, 124c, of the emitting surfaces 122a, 122c, are 0°, the transmission lights L2 can transmit through the transmission surfaces 123, 123a, 123b, 123c of the second prisms 120 directly, so that the most of the transmission lights L2 will not be reflected back into the second prisms 120, 120a, 120b, 120c and not transmit to the projection lenses and the light valves 300 of the projection apparatuses, and therefore, in addition to avoiding the light leakage, the contrast of the image can be increased. In addition, since the transmission lights L2 can transmit through the transmission surfaces 123, 123a, 123b, 123c of the second prisms 120 directly, the accumulation of heat at the lens component (second prism) can be reduced, so as to reduce the impact of heat on the quality of the projection image. Further, the step of applying black paint on the second prisms 120, 120b, 120b, and 120c can be omitted in the fabrication process of the lens component, so that the fabrication time can be reduced.

Figure 5:
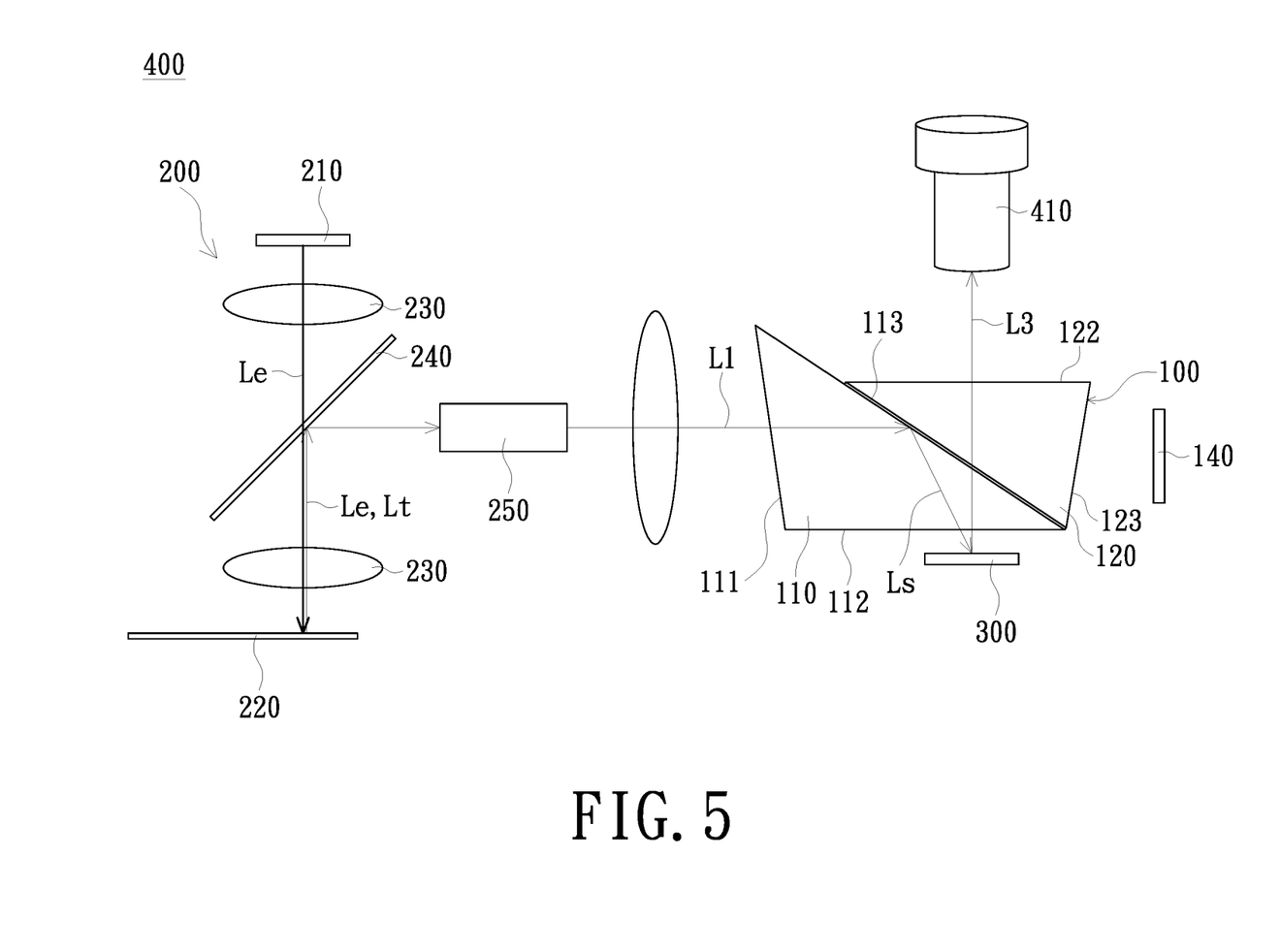
FIG. 5 is a schematic side view of a projection apparatus in accordance with an embodiment of the invention.

FIG. 5 is a schematic side view of a projection apparatus in accordance with an embodiment of the invention. Referring to FIGS. 1 and 5, the projection apparatus 400 of the embodiment includes an illumination system 200, a light valve 300, a projection lens 400, and the prism element 100 mentioned above. The illumination system 200 provides an illumination light L1. The light valve 300 is disposed on a transmission path of the illumination light L1. The light valve 300 converts the illumination light L1 into an image light L3. The projection lens 410 is disposed on a transmission path of the image light L3. The prism element 100 is disposed among the illumination system 200, the light valve 300, and the projection lens 410 to guide the illumination light L1 from the illumination system 200 toward an active surface 310 of the light valve 300 and guide the image light L3 from the light valve 300 toward the projection lens 410. For example, the illumination light L1 transmits through the first side face 111 and enters the first prism 110, the illumination light L1 transmitting through the third side face 113 forms a transmission light L2. The illumination light L1 totally reflected by the third side face 113 forms a sub-illumination light Ls. The sub-illumination light Ls transmits toward the light valve 300. The light valve 300 converts the sub-transmission light Ls into the image light L3. The image light L3 enters the first prism 110 from the second side face 112 and transmits through the third side face 113 and the incident surface 121. After the image light L3 entering the second prism 120 leaves the second prism 120 from the emitting surface 122, the image light L3 transmits toward the projection lens 410. The projection lens 410 projects the image light L3 to form an image on a screen. On the other hand, the transmission light L2 can be advanced toward the light absorption component 140 disposed in the casing or on the inner surface of the casing to be absorbed by the light absorption component 140 after leaving the second prism 120 from the transmission surface 123. Although FIG. 5 is exemplified by the prism element 100 of FIG. 1, the prism element 100 can be replaced with any one of the prism elements 100a, 100b, 100c of the embodiments mentioned above.

The light valve 300 mentioned above can be a reflective light valve 300. The reflective light valve 300 can be digital micro-mirror device (DMD), or liquid crystal on silicon panel (LCOS panel), but the invention is not limited thereto. The projection lens 410 includes, for example, a combination of one or more optical lenses having non-zero diopter, for example, a variety of combinations of non-planar lenses including a biconcave lens, a biconvex lens, a concavo-convex lens, a convexo-concave lens, a plano-convex lens, a plano-concave lens, and the like, may be used. In one embodiment, the projection lens 410 can also include a planar optical lens.

In one embodiment, the illumination system 200 includes a light source device 210 and a wavelength-converting device 220. The light source device 210 is configured to provide an excitation light Le. The wavelength-converting device 220 is disposed on a transmission path of the excitation light Le. The wavelength-converting device 220 is configured to convert the excitation light Le into a conversion light Lt. The illumination light L1 includes the excitation light Le and the conversion light Lt. The excitation light Le and the conversion light Lt transmit toward the prism element 100. The light source device 210 can be, for example, a diode module including a light emitting diode (LED) or a laser diode (LD), or a diode array including a plurality of diode modules, but the invention is not limited thereto. The wavelength-converting device 220 can be, for example, a phosphor wheel which chronologically outputs the excitation light Le and the conversion light Lt to form the illumination light L1, but the invention is not limited thereto. In addition, the illumination system 200 can further include other optical components, such as a condenser lens 230 and a color separation sheet 240 for transmitting the excitation light Le to the wavelength-converting device 200, a light homogenizing component 250 for homogenizing the illumination light L1 and transmitting the same to the prism element 100, and the like. The light homogenizing component 250 can be, for example, a light integral rod.

Figure 6:
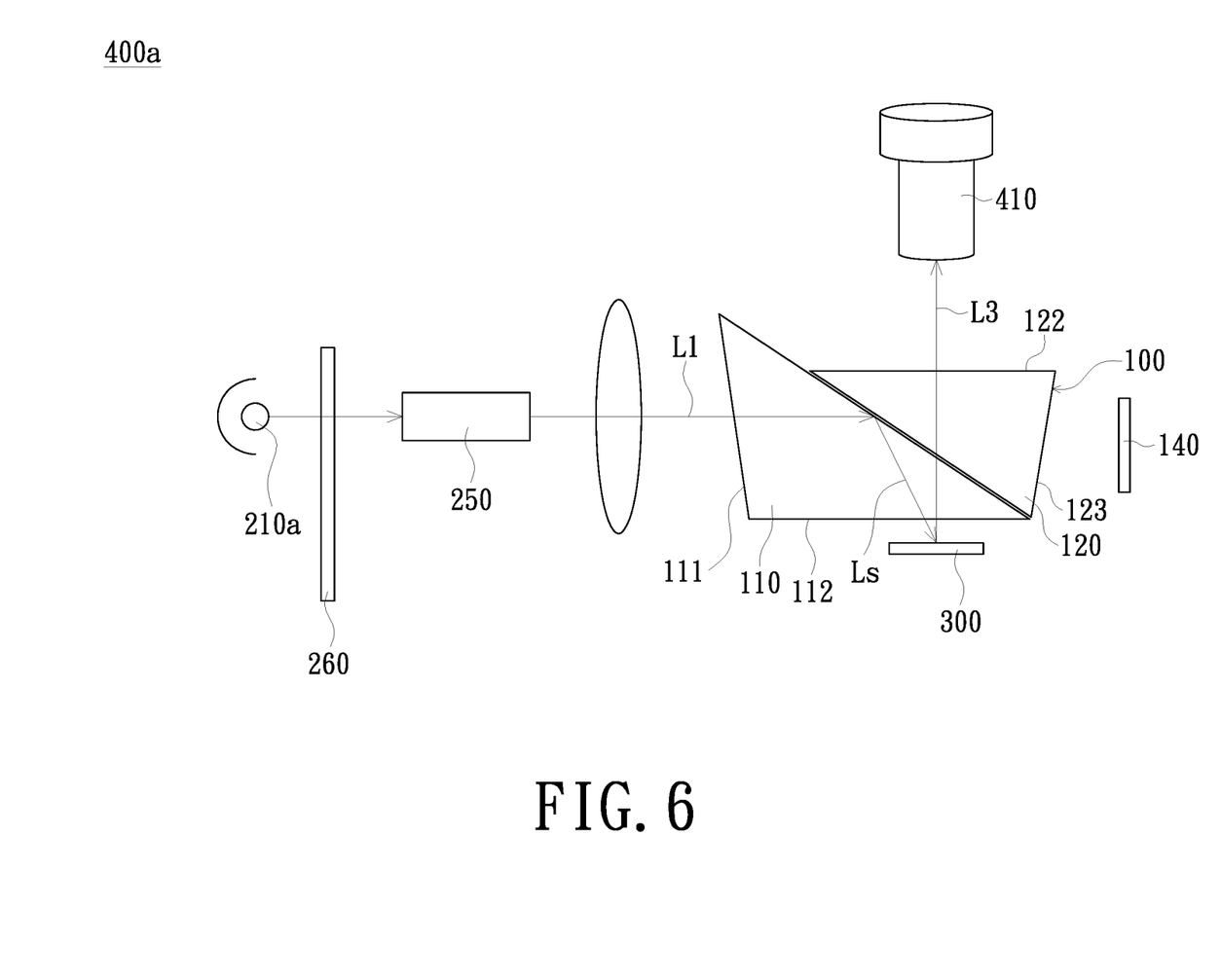
FIG. 6 is a schematic side view of a projection apparatus in accordance with another embodiment of the invention.

FIG. 6 is a schematic side view of a projection apparatus in accordance with another embodiment of the invention. Referring to FIGS. 1, 5, and 6, the differences between the projection apparatus 400a of the embodiment and the projection apparatus 400 shown in FIG. 5 lie in: the light source device 210a of the illumination system 200a in the projection apparatus 400a is a lamp, such as an ultra-high pressure mercury lamp (UHP mercury lamp), which is used with a color wheel 260 to generate chronologically color light.

In the prism elements and the projection apparatuses of the embodiments of the invention, since the angles formed between the transmission surfaces and the normal lines of the emitting surfaces of the second prisms are ±20°, the transmission lights can transmit through the transmission surfaces of the second prisms directly, so that the most of the transmission lights will not be reflected back into the second prisms of the prism elements and not transmit to the projection lenses and the light valves of the projection apparatuses, and therefore, the advantages of avoiding the light leakage and increasing the contrast of the image are achieved. In addition, since the transmission lights can transmit through the transmission surfaces of the second prisms directly, the accumulation of heat at the lens component (prism element) can be reduced, so as to reduce the impact of heat on the quality of the projection image. Further, the step of applying black paint on the second prisms can be omitted in the fabrication process of the lens component, so that the fabrication time can be reduced. Therefore, the prism elements and the projection apparatuses of the embodiments of the invention have the advantages of avoiding the light leakage, increasing the contrast of the projection image, lowering the impact of heat on the quality of the projection image, and reducing the fabrication time.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first prism, the second prism, the first side face, the second side face, and the third side face are only used for distinguishing various elements and do not limit the number of the elements.

What is claimed is:

1. A prism element, configured to be disposed between an illumination system and a light valve, and comprising a first prism, a second prism and a light absorption component, wherein:

the first prism comprises a first side face, a second side face, and a third side face, the first side face, the second side face, and the third side face are connected in sequence;

the second prism is disposed at the third side face, and comprises an incident surface, an emitting surface, and a transmission surface, the incident surface, the emitting surface, and the transmission surface are connected in sequence, and the incident surface of the second prism and the third side face of the first prism are disposed face to face, an angle between the transmission surface and a normal line of the emitting surface is between ±20°; and the light absorption component is disposed at a side of the transmission surface, and an interval is formed between the light absorption component and the transmission surface of the second prism, wherein after an illumination light provided by the illumination system transmits through the first side face and enters the first prism, a part of the illumination light is incident on the third side face with an incident angle smaller than a critical angle of total reflection, the part of the illumination light transmits through the third side face and forms a transmission light, the transmission light enters the second prism from the incident surface, and the transmission light leaves the second prism from the transmission surface, the light absorption component is configured to absorb the transmission light leaving the second prism from the transmission surface.

2. The prism element according to claim 1, wherein the second side face of the first prism faces toward an active surface of the light valve, the third side face forms a total reflection interface, and another part of the illumination light reflected by the total reflection interface forms a sub-illumination light, the sub-illumination light transmits toward the light valve, and the light valve is configured to convert the sub-illumination light into an image light.

3. The prism element according to claim 2, wherein the second side face of the first prism and the active surface of the light valve are parallel with each other.

4. The prism element according to claim 1, wherein a light transmittance of the transmission surface of the second prism is more than 90%.

5. The prism element according to claim 1, wherein the transmission surface of the second prism is a polished surface or is coated with an anti-reflection layer.

6. The prism element according to claim 1, wherein the second prism further comprises a bottom surface, the bottom surface is connected between the incident surface and the transmission surface.

7. The prism element according to claim 1, wherein the emitting surface of the second prism and the second side face of the first prism are parallel with each other.

8. The prism element according to claim 1, wherein a gap is formed between the incident surface of the second prism and the third side face of the first prism, an adhesive layer is disposed around the gap, air is in the gap.

9. A projection apparatus, comprising an illumination system, a light valve, a projection lens, and a prism element, the illumination system providing an illumination light, the light valve disposed on a transmission path of the illumination light to convert the illumination light into an image light, the projection lens disposed on a transmission path of the image light, the prism element disposed between the light valve and the illumination system to guide the illumination light toward an active surface of the light valve and guide the image light toward the projection lens, the prism element comprising a first prism, a second prism and a light absorption component, wherein:

the first prism comprises a first side face, a second side face, and a third side face, the first side face, the second side face, and the third side face are connected in sequence;

the second prism is disposed at the third side face, and comprises an incident surface, an emitting surface, and a transmission surface, the incident surface, the emitting surface, and the transmission surface are connected in sequence, and the incident surface of the second prism and the third side face of the first prism are disposed face to face, an angle between the transmission surface and a normal line of the emitting surface is between ±20°; and the light absorption component is disposed at a side of the transmission surface, and an interval is formed between the light absorption component and the transmission surface of the second prism, wherein after an illumination light provided by the illumination system transmits through the first side face and enters the first prism, a part of the illumination light is incident on the third side face with an incident angle smaller than a critical angle of total reflection, the part of the illumination light transmits through the third side face and forms a transmission light, the transmission light enters the second prism from the incident surface, and the transmission light leaves the second prism from the transmission surface, the light absorption component is configured to absorb the transmission light leaving the second prism from the transmission surface.

10. The projection apparatus according to claim 9, wherein the second side face of the first prism faces toward the active surface of the light valve, the third side face forms a total reflection interface, and the illumination light reflected by the total reflection interface forms a sub-illumination light, the sub-illumination light transmits toward the light valve, and the light valve converts the sub-illumination light into the image light.

\* \* \* \* \*